United States Patent [19]
Heine

[11] 3,992,593
[45] Nov. 16, 1976

[54] DISC PHONOGRAPH RECORD PLAYBACK BY LASER GENERATED DIFFRACTION PATTERN

[76] Inventor: William K. Heine, 334 N. Woodland Road, Ben Lomond, Calif. 95005

[22] Filed: Aug. 22, 1974

[21] Appl. No.: 499,771

[52] U.S. Cl. .................. 179/100.3 V; 179/100.3 G; 179/100.41 L
[51] Int. Cl.² .................. H04N 5/76; G11B 7/00
[58] Field of Search .............. 179/100.3 G, 100.3 V, 179/100.41 L, 100.4 R, 100.4 A

[56] References Cited
UNITED STATES PATENTS

| | | | |
|---|---|---|---|
| 1,917,003 | 7/1933 | Williams | 179/100.41 L |
| 1,944,202 | 1/1934 | Williams | 179/100.41 L |
| 3,287,563 | 11/1966 | Clunis | 179/100.41 L |
| 3,452,162 | 6/1969 | Dahlen | 179/100.41 L |
| 3,848,096 | 11/1974 | Marko | 179/100.3 G |
| 3,860,766 | 1/1975 | Mori | 179/100.41 L |

Primary Examiner—Jay P. Lucas
Attorney, Agent, or Firm—Limbach, Limbach & Sutton

[57] ABSTRACT

A laser beam is directed at the groove of a conventional disc phonograph record as it rotates, creating a reflected interference/diffraction pattern of the groove walls. The magnitude and rate of displacement of the interference/diffraction pattern is sensed and converted into an audio reproduction signal of the original phonograph recording.

12 Claims, 25 Drawing Figures

FIG. 9A
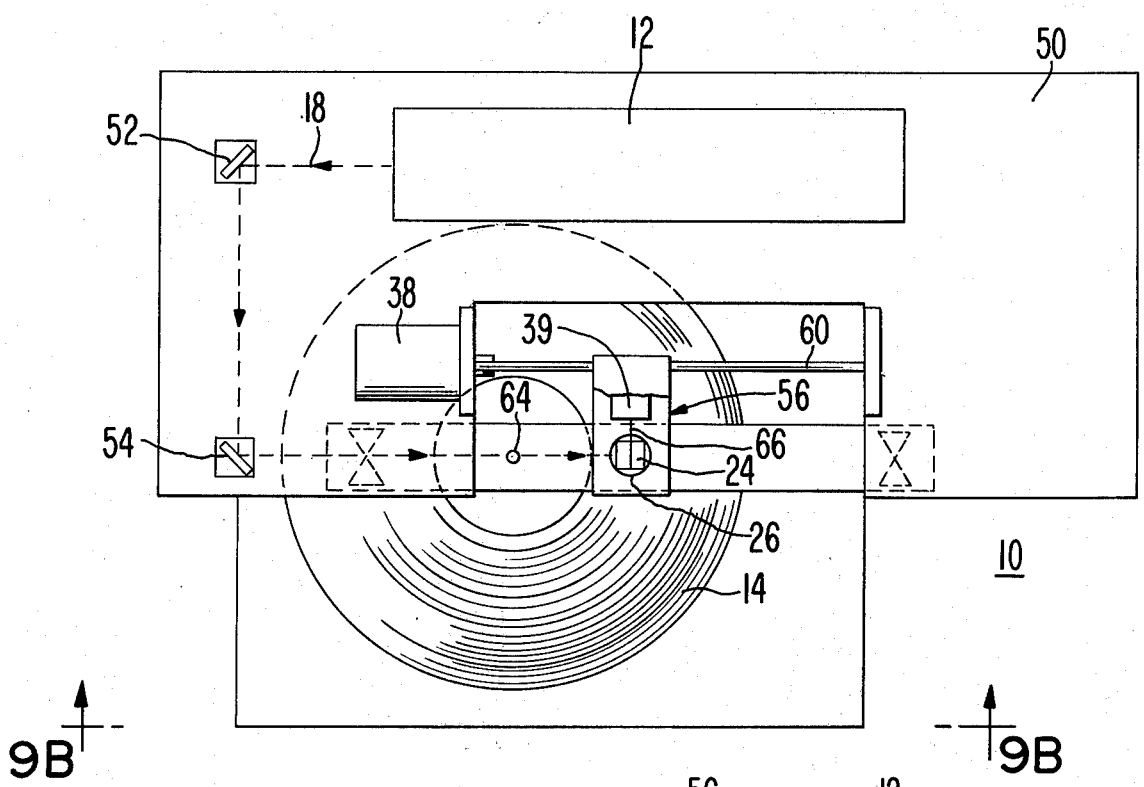
9B ←→ 9B
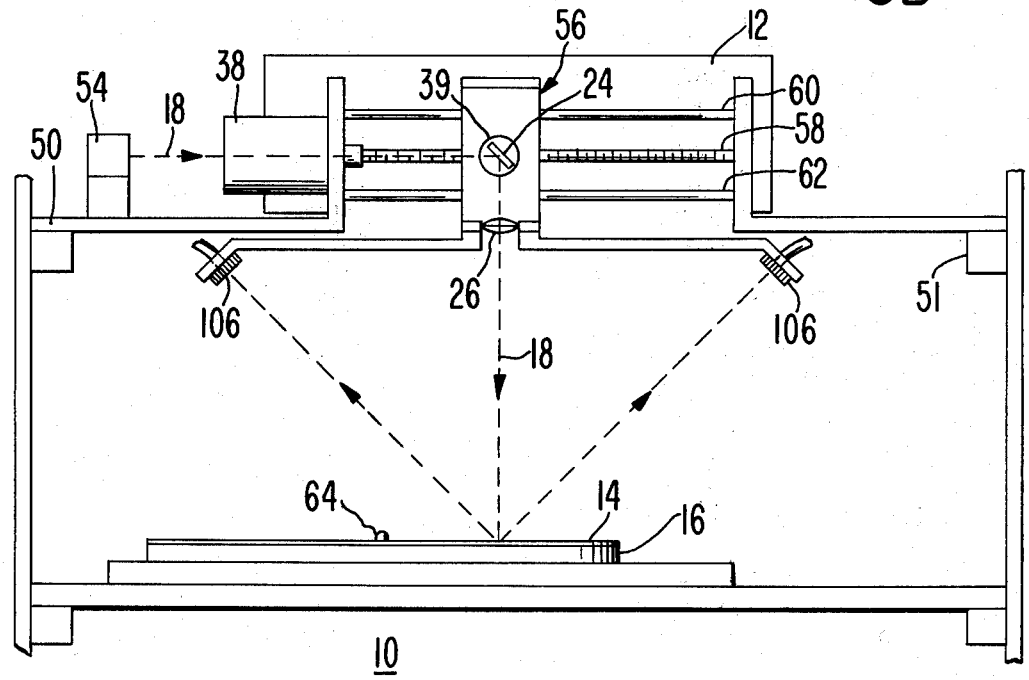
FIG. 9B

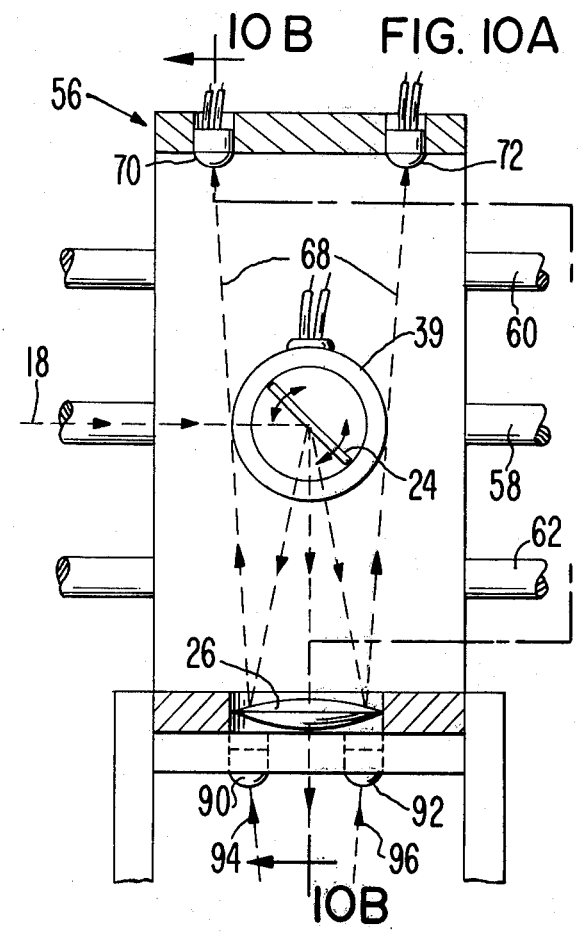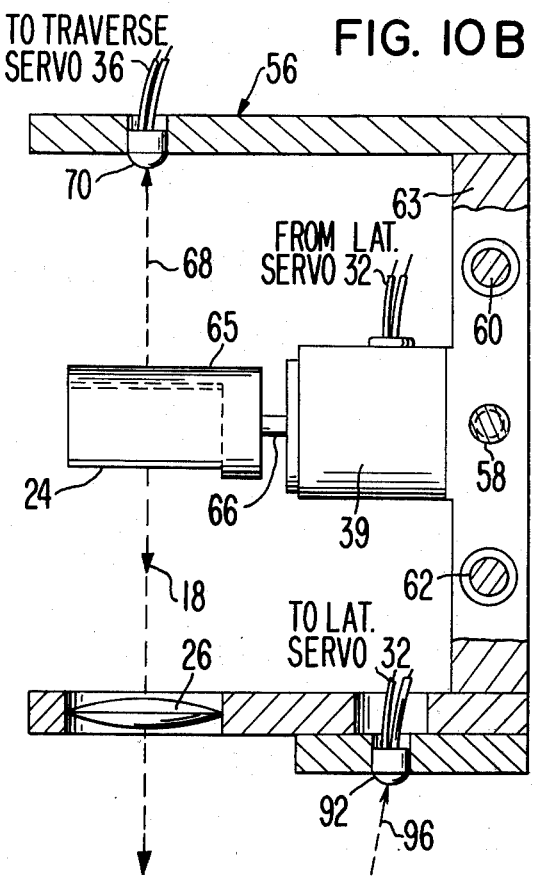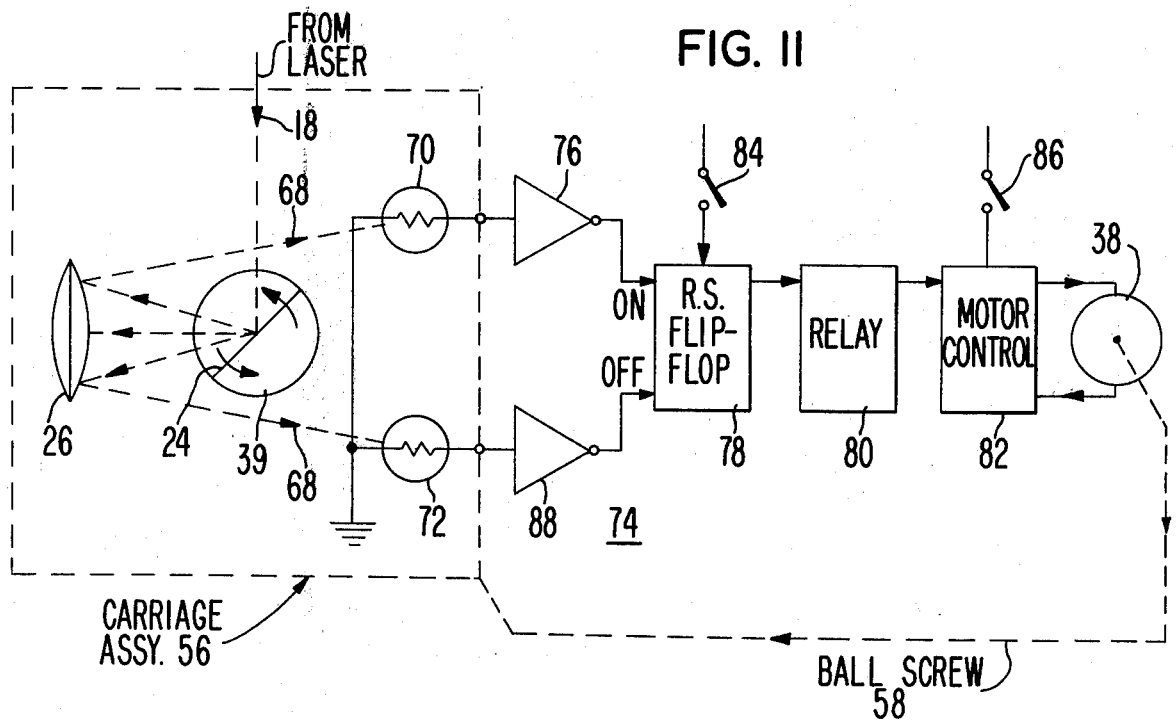

DISC PHONOGRAPH RECORD PLAYBACK BY LASER GENERATED DIFFRACTION PATTERN

BACKGROUND OF THE INVENTION

The present invention relates to an improved system for the playback of conventional disc phonograph records, and more particularly to a system using a laser beam to replace the conventional stylus or pick-up needle.

Present phonograph record playback devices make use of a stylus pick-up and electro-mechanical transducer to convert the groove modulations into electrical signals. Inherent to this technique are the problems of wear, limited bandwidth, distortion, and noise transients from scratches, contamination, and record warp.

The record is subject to wear, for example, from the stylus pick-up which is physically in contact with the groove walls. This results in loss of fidelity and distortion as the record is replayed over and over. Similarly, the stylus itself is subject to wear, which also reduces the fidelity of the reproduced sound.

SUMMARY OF THE INVENTION

It is, therefore, an object of the present invention to provide an improved playback for a conventional disc phonograph record.

Another object of the invention is to provide sound reproduction apparatus for use with conventional phonograph records which does not cause record wear and which is less susceptible to loss of fidelity and distortion due to scratches, contamination or record warp.

Another object of the present invention is to provide a record playback system wherein the conventionally used stylus pick-up is replaced by a laser.

Another object of the invention is to provide a sound reproduction system using a laser pick-up which can be used with monophonic, stereophonic, or quadrophonic recordings.

Another object of the invention is to provide a sound reproduction system having improved audio fidelity.

In accordance with the present invention, a high intensity point source of coherent monochromatic light energy, such as a laser beam, is used to illuminate the groove of a conventional disc phonograph record as it rotates. The groove wall contours alter the spatial relationship of the wavefronts, creating an interference/diffraction pattern which is geometrically related to the angular and dimensional displacement of the illuminated surfaces. These displacements are detected, and converted into electrical signals. The signals are then utilized for the audio reproduction of the recorded sound signal.

Light reflected from the flat "lands" adjacent to the spiral record groove is sensed and utilized by a two part servo system for maintaining the laser beams in the groove as the record rotates. The first part of the servo system is a high-mass, low-response, low-velocity system which is used to control the gross position of the laser beam from the outer to the inner diameter of the record as the record rotates. Since this part of the servo system controls the position of the laser beam in a direction perpendicular to the grooves, it is referred to herein as the transverse tracking servo.

The second part of the servo system is the groove-tracking or lateral servo which is a low-mass, high-response, balanced bridge system, which is used to maintain the laser beam within the record groove.

As will be explained in greater detail in the following paragraphs, the phonograph reproduction system of the present invention has many important advantages over conventional phonographs. Since only a light beam is in contact with the record surface, the record doesn't wear out. There is no needle or mechanical pick-up to wear out. The fidelity of the reproduced audio recording is better than conventional systems and is less effected by warp, scratches or dirt. Additionally, the system can be used with monophonic, stereo or multiple channel recordings.

BRIEF DESCRIPTION OF THE DRAWINGS

FIGS. 9A and 9B are top and elevational views respectively of the mechanical and optical portions of the record playback system of the present invention.

FIGS. 10A and 10B are front and side views respectively of the groove tracking or carriage assembly portion of the record playback system of the present invention.

FIG. 11 is a block schematic illustration of the traverse servo system circuit.

DESCRIPTION OF THE PREFERRED EMBODIMENTS

Basic System Description

Figure 1:
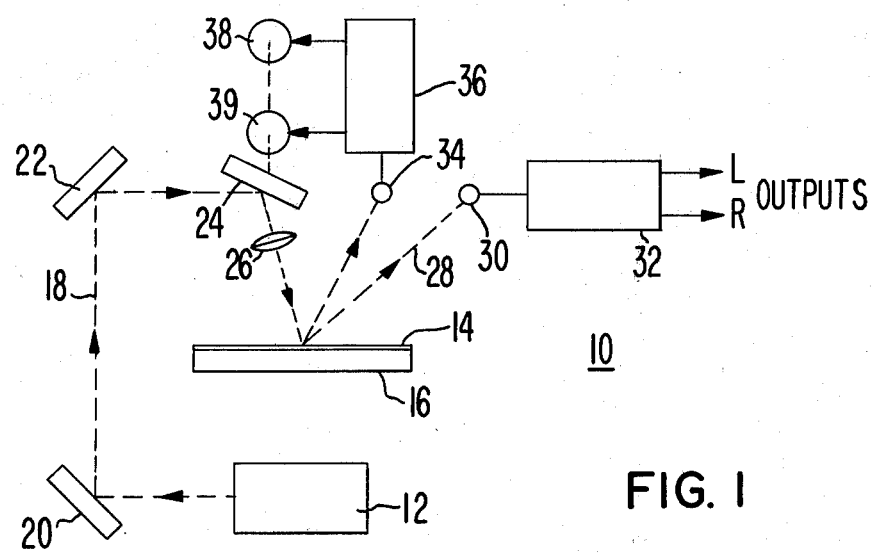
FIG. 1 is a simplified block diagram of the major components of the improved phonograph playback system of the present invention.

FIG. 1 is a simplified block diagram of the major components of the improved phonograph record playback system 10, in accordance with the present invention. A laser 12 illuminates the groove of a record 14 which is rotated on a turntable 16 of conventional design. The laser beam 18 is directed to the record 14 by mirrors 20 and 22, and 24 a lateral tracking mirror.

The laser beam 18 passes through a convex lens 26, which focuses the energy of the beam on the groove wall surfaces of the phonograph record 14. The converging light rays reflect off the groove walls, forming a interference/diffraction pattern image 28. Angular and dimensional changes of the groove walls, engraved in the vinyl surface during the recording process, produce corresponding changes in the diffraction image 28. These variations are detected by photosensors 30 and converted to electrical signals. The signals are normalized by amplifier circuit 32 to provide the left and right channel outputs, in the case of a stereophonic recording system.

Because of mechanical imperfections in the record, the grooves are never aligned with the center hole, and steps must be taken to keep the light beam 18 precisely centered on the record groove. Any gross eccentricities in the groove pitch are sensed by photodetectors 34 which sense the light reflected off of the flat "lands" between adjacent grooves, in a manner which will be described in greater detail subsequently, and a signal is fed to the two-part servo 36 which drives a transverse positioning servo-motor 38 to correct the gross position.

The rate-of-change of this displacement is quite slow when compared to the velocity of the modulation frequencies, and occurs once every revolution of the phonograph record 14. Because these changes are slow, compensation and tracking electronics are simple in design, and utilize conventional low-velocity, high-mass servo circuitry.

Mirror 24 is rotatably mounted. The angular position of mirror 24 is determined by lateral positioning motor 39. The angular adjustments of mirror 24 control the tracking of the laser beam 18 within the groove of record 14.

In contrast with the transverse servo, the lateral or beam positioning servo motor 39 is a high-velocity, low-mass system which is used to "fine tune" the laser beam within the center of the phonograph record groove.

The operation of this two-part servo system will be described in greater detail subsequently.

Laser Generated Diffraction Pattern 28

The phonograph playback system 10 of the present invention utilizes the coherent and monochromatic properties of laser light energy to form a diffraction pattern image of the record groove walls. These properties are:
1. All wave fronts are in phase.
2. All the wave fronts are in the same plane.
3. All the waves are traveling at the same velocity.
4. All the waves are traveling in the same direction.

As the beam passes through the convex lens 26, the wave fronts are bent by the glass, slowing down the edges and altering the planar characteristics. The beam converges to the focal point of the lens and then begins to diverrge and expand.

Figure 2A:
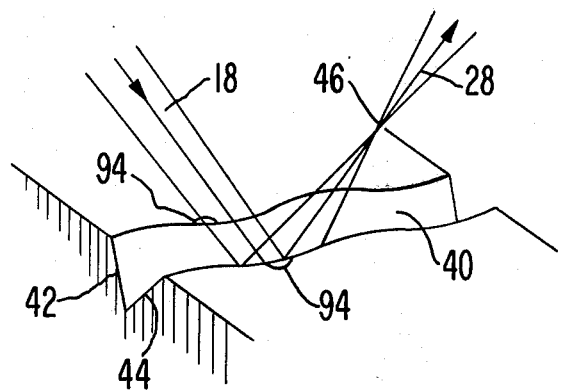
FIG. 2 is a perspective view and FIG. 2B is a top view of the intersection of a laser beam with a phonograph groove.
Figure 2B:
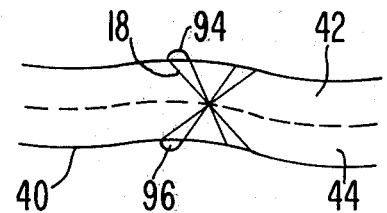

Referring now to FIGS. 2A and 2B, if the beam 18 is focused on the center of a modulated groove 40, it spreads out along the walls 42 and 44 in response to the angles of convergence, incidence, and the included wall angle. This is 45/45° for multichannel records. Note that the beam 18 is reflected off of the groove walls 42 and 44 ahead of the focal point 46 of lens 26. This is done intentionally, as will be seen in succeeding paragraphs.

Some of the rays reflect off the opposite wall, some are absorbed by the vinyl record material, and others are scattered by dust particles or reflect off the walls 42 and 44 in random directions. Thus, most of the rays reflect from the groove wall surfaces in response to:
1. The angles of incidence and reflection of beam 18.
2. The angles of convergence and divergence of beam 18.
3. The included 45/45° groove wall angles.
4. The texture of the groove wall surfaces. A microscopic observation of the groove wall reflections confirms the pattern illustrated in FIGs. 2A and 2B.

Figure 3:
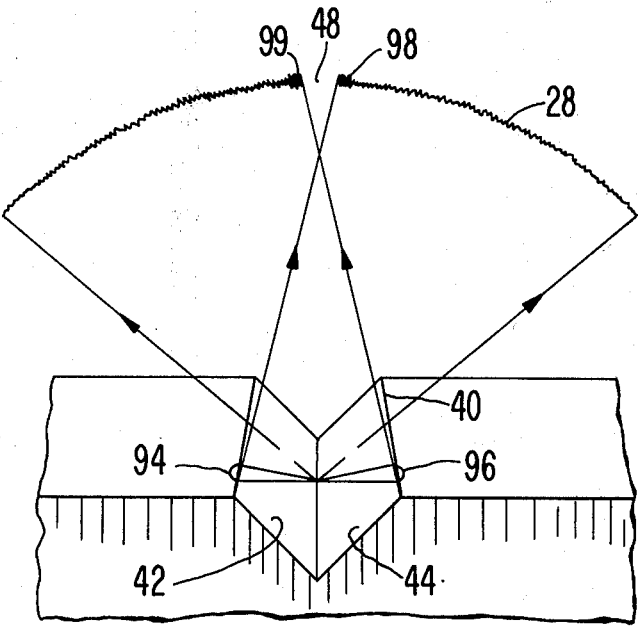
FIG. 3 illustrates the resulting diffraction/interference image when a laser beam is reflected from a record groove.

Resulting from reflected beam is the formation of the brilliant diffraction pattern image 28 of the groove 40 cross section as illustrated in FIG. 3. The image appears as a semicircular band or arc of light, broken up by one large segment 48 missing from the top-most center portion, and hundreds of smaller segments in each arc of the image band. An image reversal occurs because the beam is reflected from the groove ahead of the focal point 46. The gap 48 in the center of the semi-circle results from the image reversal and represents the widest points of separation, i.e. the top-most part of the groove, of the wall surfaces 42 and 44 illuminated by the source beam 18. By varying the angle of incidence, the image becomes almost a straight line at 90°, to a narrow peaked shape at about 10° to the record surface.

The resultant semi-circular or arc pattern 28 of the diffraction image is believed to be formed in response to a complex, multiple reflection process, which follows a precise geometrical pattern. Thus, this phenomena not only incorporates the four basic angular influences listed above, but also includes the addition and substraction of wave front energies as a result of interference. The extremely high concentration of light energy in the groove 40 permits the examination of very minute distrubances, which also influences the resultant diffraction pattern 28.

Unlike non-coherent light, there is little or no random scattering of the light beam. Almost all of the reflected light goes into the diffraction image 28. Each ray follows a precise trigonometric path. Divergence of the image, and hence enlargement, is controlled by the convex lens 26 and results from the beam coherence.

The image increases in size at a linear rate of expansion and remains clearly defined ever over several 1000 diameters of magnification. Thus, it is not necessary to use a microscope to observe and detect the image.

Figure 4A:
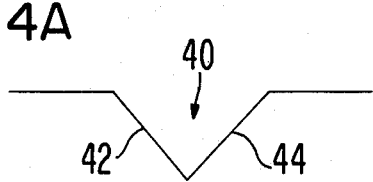
FIG. 4A is a cross-sectional view of an unmodulated record groove and FIG. 4B is the diffraction pattern for a laser beam reflected from the groove of FIG. 4A.
Figure 4B:
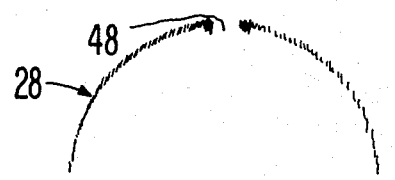
Figure 5A:
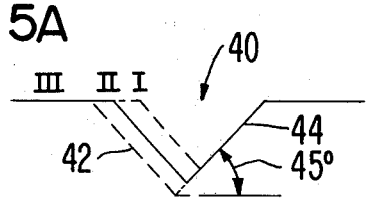
FIG. 5A is a cross-sectional view of a record groove for one cycle of a modulating signal in the left channel of a two-channel stereo (45/45) recording and FIG. 5B is the diffraction pattern for a laser beam reflected from the groove of FIG. 5A.
Figure 5B:
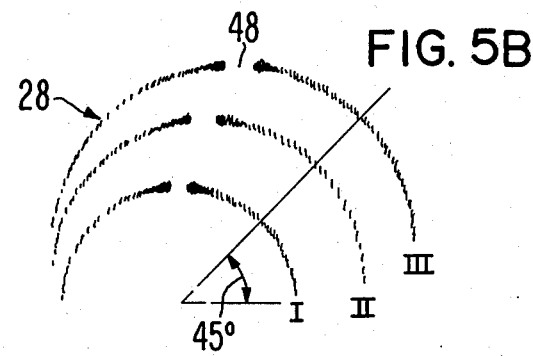

FIG. 4A is an illustration of the groove cross-section, and represents the wall positions under an unmodulated condition. FIG. 4B illustrates the diffraction image 28 for this condition. FIGS. 5A and 5B are illustrations of the groove and diffraction image for one cycle of the modulating signal, in the left channel of a two-channel 45/45° (stereo) modulation recording.

The Roman numerals in these figures correlate the position of the diffraction pattern with the physical position of the groove walls.

Notice that as the groove wall 42 is displaced along a 45° vector, the image arc follows this displacement. That is, the light band or arc is radially displaced along a 45° vector in proportion to the displacement of the groove well. Note also, that as the size of the groove increases and decreases, so does the image increase and decrease proportionately. The distance that the groove wall travels, above and below the middle or unmodulated point (Condition II) represents the amplitude of the recorded signal. Moreover, it represents the peak-to-peak displacement of the groove wall. The range of displacements, from the smallest to the largest, represents the dynamic range of the recording. Note that there is nothing in the displacement of the image to hamper the dynamic range of the playback system 10. There are also no limitations on peak amplitude of the reproduced signal, save the maxiumum displacements of the recording itself.

The rate at which the groove wall travels from one peak to the other represents the frequency of the recorded sigal. The faster the wall moves, the higher the frequency of the signal. Note that there is nothing in the image displacement that can interfere with the rate-of-change of the displacement. Thus, the frequency response of the playback system is limited to the response of the recorded signal.

Figure 6A:
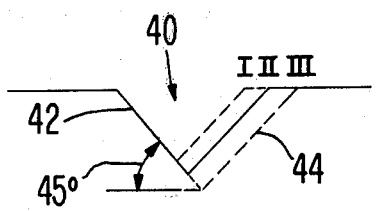
FIG. 6A is a cross-sectional view of a record groove for one cycle of a modulating signal in the right channel of a two-channel stereo (45/45) recording and FIG. 6B is the diffraction pattern for a laser beam reflected from the groove of FIG. 6A.
Figure 6B:
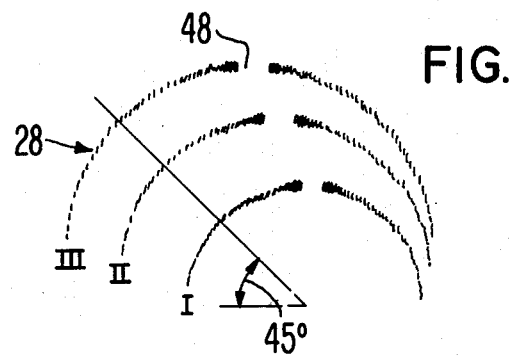
Figure 7A:
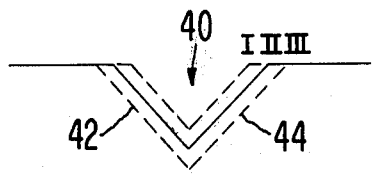
FIG. 7A is a cross-sectional view of a record groove during one cycle of an out-of-phase modulated (vertical) recording and FIG. 7B is the diffraction pattern for a laser beam reflected from the groove of FIG. 7A.
Figure 7B:
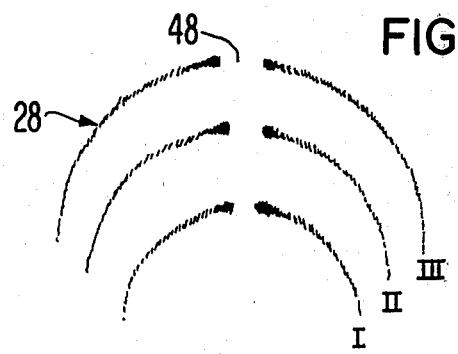
Figure 8A:
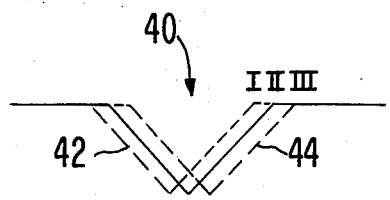
FIG. 8A is a cross-sectional view of a record groove during one cycle of an in-phase modulated (lateral) recording and FIG. 8B is the diffraction pattern for a laser beam reflected from the groove of FIG. 8A.
Figure 8B:
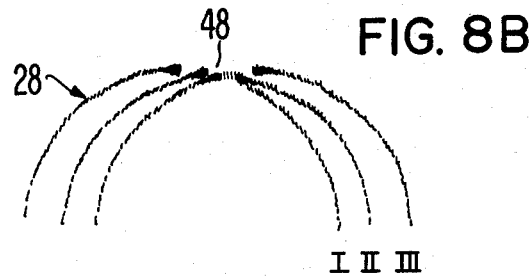

FIGS. 6A and 6B illustrate the response of the diffraction image 28 to one cycle of modulation on the right groove wall 44. The behavior of the image is identical to that of the left channel recording, except for the image displacement at 90° in the opposite direction.

FIGS. 7A-7B and 8A-8B illustrate the effects of out-of-phase (vertical), and in-phase (lateral) recordings on the diffraction image 28. These types of recording are most common with 78 rpm records, although occasionally they occur in a stero recording. In both examples, the displacement of the image follows the displacement of the groove wall cross-section so any of these recordings can be reproduced with the playback system 10. Thus, there are no physical limitations to the type of recording to be reproduced by the laser playback system of the present invention, whether the recording has been recorded by vertical, lateral or 45/45° processes, or a combination of these.

When the beam of light 18 strikes a dust particle or scratch in the records, the light scatters in random directions. This results in a reduced intensity of the light band or arc diffraction image, and hence the amplitude of the reproduced signal. Thus, the primary surface noise components of the record are reduced, in contrast to mechanical pickup devices, which generate noise "pops" and "clicks" as they encounter these defects.

Major Mechanical Assemblies

FIGS. 9A and 9B illustrate in greater detail the mechanical and optical parts of the record playback system 10 of the present invention. The laser 12 is mounted on the rear of a baseplate 50 which is supported by a frame 51 above the turntabel 16. The laser beam 18 exits from the left end of the laser 12 and is reflected from two fixed mirrors 52 and 54, a total of 180° back towards a groove tracking or carriage assembly 56 which supports the convex lens 26 and which rotatably supports the lateral tracking mirror 24. The baseplate 50 may be pivotally supported so that it can be tipped forward from 0° to 15° to adjust the vertical angle of the beam 18.

The groove tracking or carriage assembly 56 shown in greater detail in FIGS. 10A and 10B is driven over the top of the record surface by the transverse servo motor 38 in combination with a laterally-extending lead or ball screw 58. Tracking assembly 56 is also supported and guided by a pair of support rods 60 and 62. The groove tracking assembly also supports the lateral positioning motor 39 by means of a mounting plate 63.

The transverse servo and linear translator assembly just described have the following major purposes:

1. To maintain the lateral tracking mirror 24 and lens 26 over a specific "band" of 6-8 record grooves, from the beginning to the end of the record. That is, it tracks the record groove spiral.
2. To move the carriage 56 rapidly, in or out, across the record surface for "cueing up" on a specific selection, or the start of the record.
3. As an added feature, the laser beam 18 can be directed onto the center spindle 64 of the turntable 16. When the operator first places a record on the turntable, he may have difficulty locating the center hole of the record on the turntable spindle. The laser beam provides a "glide path"; that is, the operator observes the bright spot of light on the record and simply centers it in the record center hole. By keeping the beam in the center hole, he can easily guide the record down on the turntable spindle 64.

The laser beam 18 is reflected from the rotating lateral tracking mirror 24 down through the convex lens 26 to the record surface 14. The rotating mirror 24 is mounted on mirror support 65 to the end of the lateral tracking servo motor 39 drive shaft 66. The lateral servo motor 39 and mirror 24 have only one purpose; to keep the laser beam 18 in a single groove. That is, it tracks the groove inspite of the minor lateral ecentricities of the phonograph record.

Transverse Servo Operation

Assume that the carriage 56 is stopped over the record 14 and the record is turning. The lateral tracking servo motor 39 rocks back and forth, i.e. rotates clockwise and counterclockwise, keeping the beam locked in the groove in a manner which will be described in greater detail subsequently. However, the groove pitch causes the servo motor 39 to direct the laser beam closer and closer to the edge of the convex lens 26. At this point if the system 10 were to do nothing to "catch" up to the groove spiral, the laser beam 18 would "walk" off the convex lens 26.

To prevent this, when the maximum counter clockwise (CCW) limit photo-detectorr 70 senses the backside reflection 68, it turns "on" the transverse servo motor 38. The transverse servo motor 38 begins turning the ball screw 58 which moves the carriage 56 slowly toward the center of the record. The lateral servo motor 39 continues to rock the mirror 24 back and forth as required to maintain the beam locked to the groove. The average position of the beam on the convex lens 26 shifts from one side to the other as the carriage 56 moves. The carriage continues to move until the backside reflection 68 is picked up by the maximum clockwise (CW) limit photo-detector 72. When this occurs, the transverse servo motor 38 is turned "off" and the carriage 56 stops moving. Thus, the transverse servo system "walks" the carriage assembly 56 across the record 14 from the outside to inside.

The schematic diagram of the transverse servo electronics circuit 74 is illustrated in FIG. 11. The maximum CCW lens limit photo-detector 70 changes value when stimulated by the laser light 68 reflected from the backside of the lens 26. This change in value causes a pulse generator 76 to trigger a flip-flop 78 which sets and turns on the transverse servo motor 38 through the motor power relay 80 and motor control 82. Switch 84 is a manual over-ride switch which the operator can use to move the carriage assembly 56 to a desired spot on the record. A switch 86 can be used to reverse the servo operation, to make the carriage move from the inside to outside of the record for very old 78 rpm records.

The lateral servo maintains the beam in the groove as the carriage assembly 56 moves toward the center of the record 14. The laser beam 18 scans across the lens 26 to its opposite side, energizes maximum CW limit photo-detector 72, and triggers a pulse generator 88 to reset the flip-flop 78, stopping the transverse servo motor 38. The transverse is known as a "bang-bang" servo, that is, it turns on, runs and turns off, repeating this operation across the record.

The Lateral Tracking Servo

Referring to FIG. 10A, there are two lateral position sensor photo-detectors 90 and 92 mounted on the bottom of the groove tracking carriage assembly 56. These two photo-detectors are part of a balanced bridge circuit which is similar to a wheatstone bridge. As long as the light intensity is equal on the two photo-detectors 90 and 92, the system is balanced and the lateral servo motor is stopped. During normal operation, the system is constantly trying to maintain balance, and the beam swings back and forth in time with the rotating record.

Figure 12A:
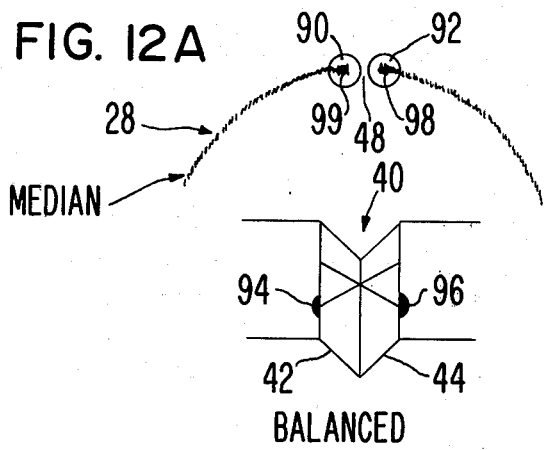
FIGS. 12A and 12B illustrate the relationship of a pair of groove tracking photo-sensors relative to the record groove for the situation where the laser beam is correctly aligned with the record groove, and where it is misaligned with the record groove, respectively.
Figure 12B:
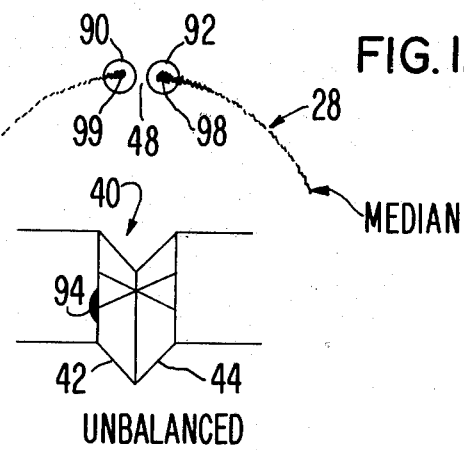

The laser light focused on the groove overlaps on the flat "lands" area on each side of the groove. In normal operation there are two over-lap areas of light 94 and 96 which are shown in FIGS. 12A and 12B. This reflected light 94 and 96 is intercepted by two photo-detectors 90 and 92, mounted to the carriage assembly 56. In the resulting diffraction image 28, this light corresponds to two bright spots 98 and 99 on the inside part of the diffraction image as shown in FIG. 3. As the record revolves the groove shifts back and forth relative to the carriage assembly 56 in a lateral direction.

For example, if the groove "tends" to move toward the center of the record (FIG. 12B) the outside photo-detector 90 receives less light, i.e. spot 99 of the diffraction image is less intense than spot 98, and the inside detector 92 more light. This unbalances the bridge circuit formed in part by the two photo-detectors 90 and 92 causing the servo motor 39 to rotate the mirror 24 in a clockwise direction. This causes the reflected laser beam to move toward the center of the record, thus maintaining illumination of the groove.

The words "tends" is important since the lateral tracking servo system does not respond to lateral signal modulation of the groove walls. Rather only the average location of the groove is picked up. Thus, the system response is slow enough that it is not influenced by recorded signals or even momentary loss of the "land" images 94 and 96 which sometimes occurs in over-modulation of the groove.

Figure 13:
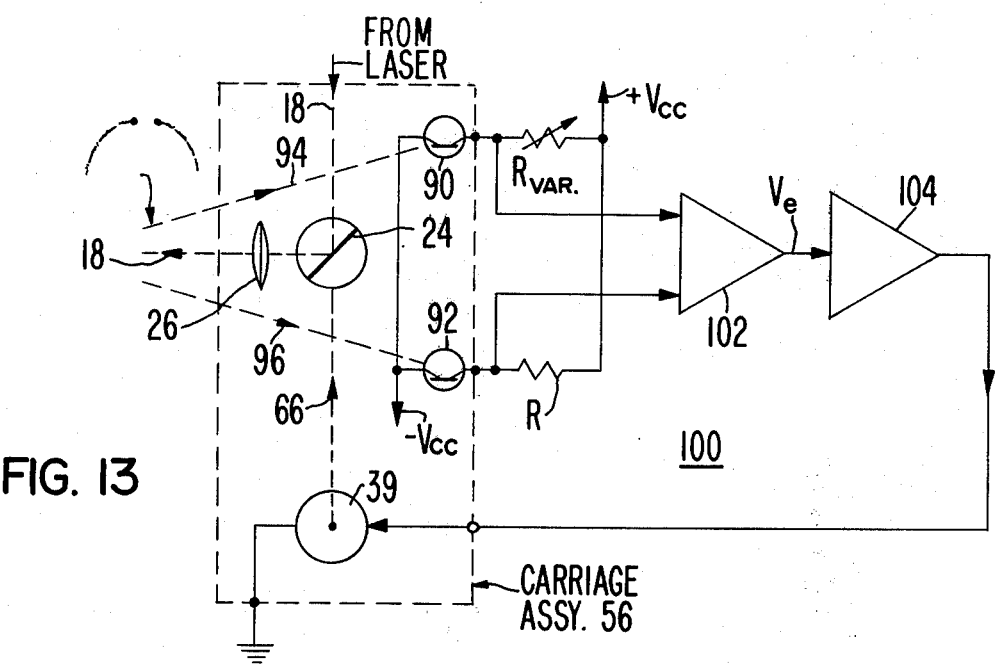
FIG. 13 is a block schematic illustration of the lateral tracking servo system circuit.

The schematic diagram of FIG. 13 illustrates the electrical circuit 100 for the lateral tracking servo system. Any unbalance of the bridge formed by the photo-detectors 90 and 92, resistor R and variable resistor $R_{var}$, is sensed by a differential amplifier 102 which outputs a DC error voltage, $V_e$, of the proper polarity and magnitude. $V_e$ is amplified by the motor drive amplifier 104 and applied to the lateral servo motor 39. This motor operates like a galvonometer and deflects the mirror 24 in an amount and direction proportional to the unbalance. Since this action shifts the laser beam back into the groove, the system regains balance $V_e$ drops back to normal.

Note that the lateral or beam centering servo system is electrically isolated from the transverse servo system. Although both systems are electronically independent of one another, they are mechanically linkled by virtue of the fact that the lateral groove tracking assembly rides "piggyback" on the transverse carriage assembly 56.

In summary, the lateral servo maintains the beam in the groove over an area equivalent to approximately 3 to 4 adjacent grooves at a pitch of around 250 lines per inch. The transverse servo responds to lens limit positions to maintain the carriage to within an average of between 6 to 8 grooves of the desired locations. Thus, the lateral and transverse servo systems work as a team; the lateral servo responding to the average position of the groove, and the transverse servo responding to the average position of the mirror 24. These two systems operate continuously to keep the beam in the groove from the beginning to the end of the record.

"False" shaft position signals can be inserted into the transverse servo input by control switches to make the carriage move at a higher speed and, as already set forth, to move toward or away from the center. This permits "cueing up" on a specific groove or selection on the record. It can also be used to skip a groove, in the unlikely event that a deep scratch should cause the beam to "hang up".

Diffraction Pattern Detection System

Since the groove modulation occurs as a displacement of the image above and below a middle or unmodulated point, the first problem in detecting the recorded phonograph signal is to convert these displacements into changes in electrical signals. Photo-detection devices are only sensitive to changes in light intensity. Thus, it is necessaray to first convert the diffraction image displacements into light energy whose brightness is proportional to the magnitude of the displacement.

Figure 14:
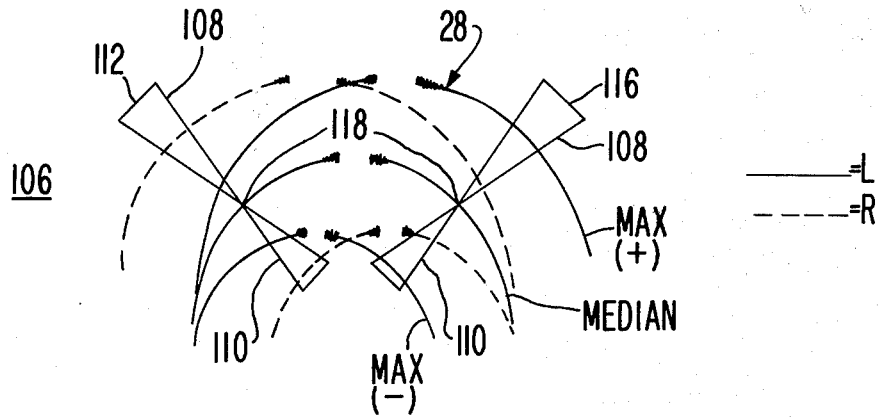
FIG. 14 is a diagrammatic illustration of a light converter/detector system in accordance with the present invention.
Figure 15:
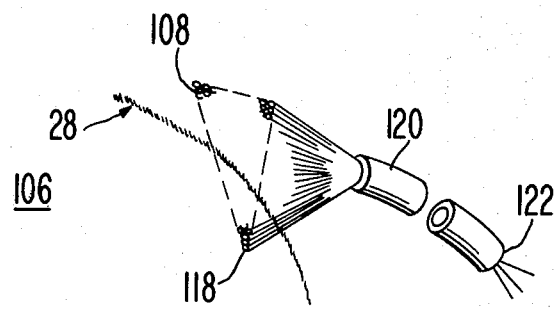
FIG. 15 is a perspective view of the fiber optical component of the converter/detector system of FIG. 9.

FIGS. 14 and 15 illustrate the components which make up such a light converter 106. Two wedge-shaped fiber-optics bundles 108 and 110 are inserted in each of the 45° diffraction pattern axes to form right and left channel converters 112 and 116 respectively. Converters 112 and 116 are each arranged so that they form an "X", with the apex 118 centered on the median or unmodulated point of reference. The fiber optical bundle 120 is non-coherent. The ends of bundle 120 for each of the wedges 108 and 110 of each converter 112 and 116 is secured in proximity with a photo-detecting device 122.

As the image 28 is displaced away from the median, more and more light falls on one of the fiber-optic bundles 108 or 110. Thus, very little light reaches the photo-detector 122 when the image is at the crossover point, while maximum light is conducted to photo-detector 122 at the extreme ends of travel of the diffraction image. This arrangement holds true for both channel vectors.

The two photo-detectors 122 for each converter 106 are wired so that the polarity of the signals between the upper and lower displacements are reversed. That is, the fiber optical bundle 108 generates a positive-going signal from one photo-detector 122, and the fiber optical bundle 110 generates a negative-going signal from the other photo-detector 122. Thus, as the image is displaced above and below the median, the photo-detectors 122 generate alternate positive and negative voltages, i.e. bipolar signals, for each channel.

Figure 16:
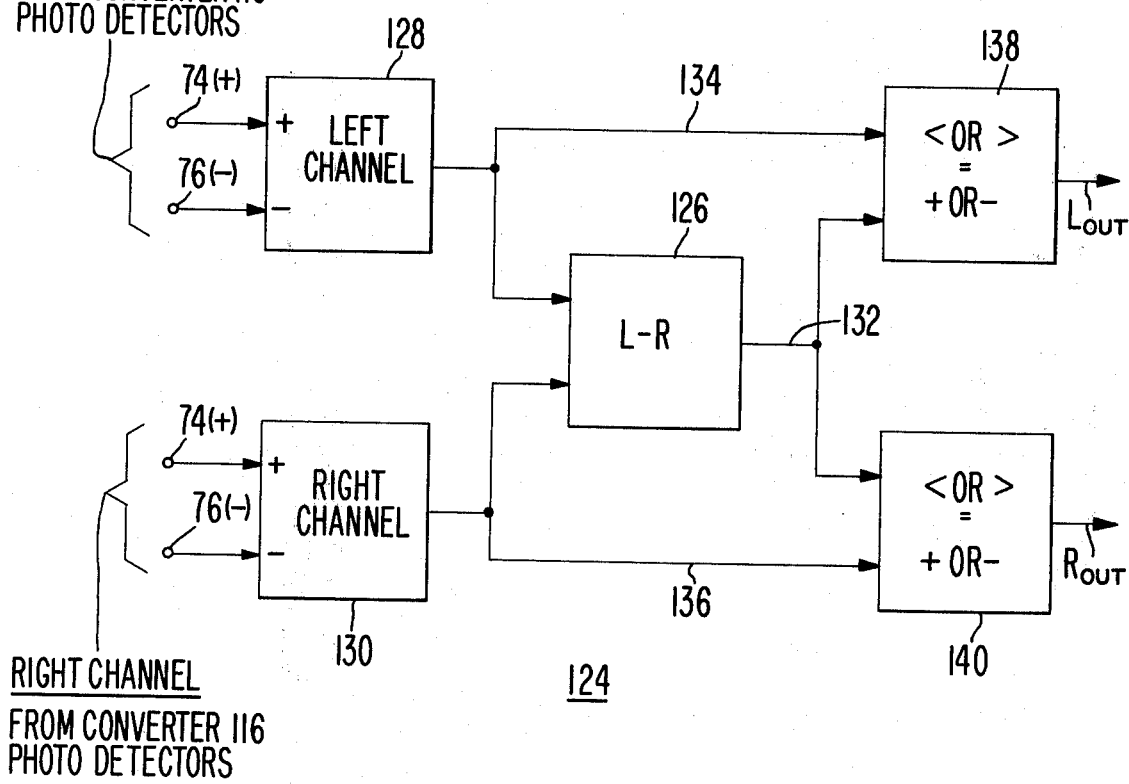
FIG. 16 is a block schematic diagram of a circuit to eliminate cross-talk between left and right channel diffraction pattern images.

As illustrated in FIG. 14, part of the left channel diffraction image appears in a portion of the right channel detector 116 and part of the right channel diffraction image appears in a portion of the left channel detector 112. The left channel diffraction image is, for purposes of clarity, indicated by solid lines and the right channel diffraction image by dashed lines, FIG. 16 illustrates a circuit 124 to eliminate this "cross-talk" effect between channels. Circuit 124 differentiates between the desired and undesired signals in the following manner.

As can be seen by reference to FIG. 14, the unwanted signal is always the same polarity but always at a lower amplitude than the desired signal. The desired and undesired signals from wedges 108 and 110 for each of the left and right channel converters 112 and 116, respectively, are passed through a differential amplifier 126 after each channel is first amplified by operational amplifiers 128 and 130, respectively, and the output 132 is compared to the two amplified original photo-detector signals 134 and 136.

The signal is higher in amplitude than the difference signal is allowed to pass through the logic circuitry 138 (left channel) and logic circuitry 140 (right channel) to the output connector; the lower, i.e. the undesired, of the two is blocked. Signals of opposite polarity or equal amplitude will all pass through the system, permitting the reproduction of vertically and laterally generated monaural recordings.

Lens Component

The apparatus of this invention uses a simple convex lens 26 to focus the beam within the record groove. A property of the laser which makes it useful in this application is that most of the energy is concentrated in a small beam diameter. By using a small beam diameter, approximately 1.5 mm, the equivalence of "stopping down" the lens on a camera is achieved. The depth of field increases with the smaller lens opening. This same effect permits large variations in the vertical displacement of the record surface, i.e. warpage, without disturbing the area of illumination.

The smaller beam diameter permits the use of a small lens 26, thus reducing the mass of the tracking assembly 56. It also allows the use of only the "best part" of the lens. And finally, since the beam emerges from the laser as a small diameter it is not necessary to incorporate special optics to reduce the beam down to a workable size.

IN the embodiment described, lens 26 has a 250 mm. focal length. This embodiment has the advantages that the play-back pick-up assembly is relatively remote from the record surface which makes record changing easier and reduces the complexity of the mechanics.

The carriage 56 is located 8-10" or futher above the turntable 16 and the only evidence of operation is the laser beam 18 shining down on the record.

It is also possible to use other lens arragements to achieve a variety of images. For example, lens 26 can be carried by a carriage assembly which is located very near to the record surface. In this case, the lens must have a much shorter focal length.

One of the principal reasons for using the laser as a light source is that the beam divergence is negligible at the working distances involved in this sound reproduction application, and the placement of the optical components is not critical. If non-coherent light were used as the primary light source, the beam divergence would impose severe restrictions on the location of the optical components, which would result in critical adjustment and alignment procedures.

Desirably, the convex lens 26 focuses the beam sufficiently so that the beam width at the intersection of the beam and the record surface is no greater than the width of one groove plus the width of the flat land areas on either side of the groove. If the beam is narrower than the width of the groove, there are no light reflections from the flat land areas adjacent thereto. This occurs sporadically during playback but so long as it is only a temporary condition there is no loss of the servo system since the response is slow compared to the rate-of-change of such interruptions.

If the beam is too wide, i.e. greater than the width of one groove and the adjacent flat land areas thereto, multiple images of the lands and grooves occur. This causes "cross-talk" between the diffraction images of the recording channels.

The angle of the laser beam 18 to the record surface is not critical. In the particular embodiment illustrated, the angle of the incoming laser beam 18 is nearly vertical. However, if the carriage assembly 56 is located near to the record surface, for example, the laser beam angle can be increased with no loss of performance of the sytem. For example, the laser beam can be at an angle of 30° to the normal to the record surface or even greater for satisfactory operations. If the beam angle is too shallow, the laser beam will begin in illuminate upcoming groove modulations causing cross-talk between adjacent grooves.

In the embodiment described, the focal point of the convex lens 26 was chosen to be located at a point past the intersection of the beam with the record surface. It is believed that placing the focal point at that location helps to immunize the system from warp. By placing the focal point on the far side (reflected) of the record, the warp tends to move the groove into a wider beam rather than into a narrower one. However, the focal point position is not critical and can be selected to be either at or before the record groove.

The present system is optically immune to modest amounts of record warp. The laser diffraction image 28 always maintains a clear, sharp image regardless of the degree of warp.

Standard differential amplifiers may be employed in the matrix circuit 124 of FIG. 16 and in the lateral tracking servo sytem circuit 100 in FIG. 13. In one actual embodiment, integrated circuit SN 709 linear differential amplifiers were employed.

In conclusion, the diffraction pattern image from the reflected laser beam represents the angular and dimensional equivalence of the groove wall cross-sectional geometry. This singular characteristic separates the operation of this device from the techniques utilized in the prior art. The signals generated by the groove modulation photo dectector represent the instantaneous vectorial position of the groove. Thus, the laser playback system of the present invention emulates the operation of a mechanical stylus in every way except one: nothing but laser light energy touches the record groove.

What is claimed is:

1. Apparatus for the playback of conventional disc phonograph records comprising a spiral recording groove having intersecting groove walls engraved in the disc surface and where flat land separates adjacent portions of the spiral groove, comprising:
   a. a laser for providing a laser beam of light;
   b. means for rotating a disc phonograph record to be played at the required rotational velocity;
   c. means for directing said laser beam to illuminate the record groove to create an interference-diffraction pattern comprising an arc of light of variable radius which is radially displaced along a vector, above and below a middle unmodulated position, and whose maximum-to-minimum radial displacement relative to its unmodulated position is proportional to the actual groove wall displacement relative to its unmodulated position and represents the amplitude of the recorded signal, and wherein the rate of change of the radial displacement of the arc of light corresponds to the frequency of the recorded signal;
   d. tracking means for maintaining said laser beam directed within the record groove as the disc phonograph record rotates;
   e. means positioned to intercept the interference-diffraction pattern for detecting the displacements of the interference-diffraction pattern created by the reflected laser beam; and
   f. means responsive to said detecting means for converting said displacement variations of the interference-diffraction pattern into an electrical sound reproduction of the recording.

2. Apparatus as in claim 1 including means for narrowing the laser beam to provide a beam width no wider than the width of the combination of the record groove and the flat land areas adjacent thereto at the intersection of the beam and the disc phonograph surface.

3. Apparatus as in claim 2 wherein said laser beam narrowing means comprises a convex lens situated in the path of the laser beam between said laser and the disc phonograph record.

4. Apparatus as in claim 3 including means for positioning said convex lens so that the focal point thereof is situated beyond the intersection of the laser beam and the record surface.

5. Apparatus as in claim 4 wherein said tracking means includes beam centering means responsive to light reflected from the flat land areas adjacent each side of the groove for centering the laser beam within the groove, said beam centering means being sensitive to relative imbalance in the amount of light reflected from the respective adjacent lands.

6. Apparatus as in claim 2 wherein said tracking means includes beam centering means responsive to light reflected from the flat land areas adjacent each side of the groove for centering the laser beam within the groove, said beam centering means being sensitive to relative imbalance in the amount of light reflected from the respective adjacent lands.

7. Apparatus as in claim 1 including means for converting said arc displacements to an electrical signal which is proportional to the amplitude and frequency of the recorded signal.

8. Apparatus as in claim 1 wherein said detecting means includes means for converting the variable radial arc displacement to light whose brightness is variable and proportional thereto.

9. Apparatus as in claim 8 including photo detecting means responsive to said displacement-to-brightness means for converting said light of variable brightness to an electrical signal whose amplitude is proportional to the displacement of the light arc.

10. Apparatus as in claim 9 wherein said displacement-to-brightness means comprises end-to-end wedge-shaped fiber-optical bundles with the ends thereof located at the unmodulated position of the interference-diffraction pattern and wherein for each wedge the number of fibers therein increases proportionally in number with the displacement distance from the unmodulated position.

11. Apparatus as in claim 1 including means for preventing interfering cross talk from the diffraction patterns of the two groove walls forming the recording groove.

12. Sound reproduction apparatus for the playback of conventional disc phonograph records having grooves containing sound signal information recorded therein comprising:
   means for directing a laser beam along and within the grooves of a rotating disc phonograph record to create a dynamic interference-diffraction light pattern comprising an arc of light of variable radius which is radially displaced along a vector, above and below a middle unmodulated position, and whose maximum-to-minimum radial displacement relative to its unmodulated position is proportional to the actual groove wall displacement relative to its unmodulated position and represents the amplitude of the recorded signal, and wherein the rate of change of the radial displacement of the arc of light corresponds to the frequency of the recorded signal; and
   means for detecting said radial displacments of said dynamic interference-diffraction light pattern and converting the same to an electrical sound signal reproduction of the original disc phonograph recording.

* * * * *

UNITED STATES PATENT AND TRADEMARK OFFICE
CERTIFICATE OF CORRECTION

PATENT NO. : 3,992,593
DATED : November 16, 1976
INVENTOR(S) : William K. Heine

It is certified that error appears in the above-identified patent and that said Letters Patent are hereby corrected as shown below:

Delete "transverse" and insert --traverse-- in each of the following occurrences: Col. 1, line 64; Col. 3, lines 34 and 49; Col. 6, lines 6, 13, 41, 56, 57 and 67; Col. 7, lines 1, 4, 23, and 24; and Col. 8, lines 15, 19, 24, 27, 29 and 34.

Col. 1, line 56, delete "beams" and insert --beam--.
Col. 3, line 35, after "gross" insert --beam--.
Col. 3, line 63, after "All" insert --the--.
Col. 4, line 25, after "from" insert --the--.
Col. 4, line 47, delete "substraction" and insert --subtraction--.
Col. 4, line 59, delete "ever" and insert --even--.
Col. 5, line 8, delete "well" and insert --wall--.
Col. 5, line 24, delete "sigal" and insert --signal--.
Col. 5, line 39, delete "stero" and insert --stereo--.
Col. 5, line 63, delete "turntabel" and insert --turntable--.
Col. 6, line 37, delete ";" and insert --:--.
Col. 6, line 39, delete "ecentricities" and insert --eccentricities--.
Col. 6, line 55, delete "detectorr" and insert --detector--.
Col. 7, line 24, insert --servo-- before "is".
Col. 7, line 61, delete "words" and insert --word--.
Col. 8, line 12, after "balance" insert --and--.
Col. 9, line 21, delete "," and insert --.--.
Col. 9, line 64, delete "IN" and insert --In--.
Col. 10, line 1, after "carriage" insert --assembly--.
Col. 10, line 27, insert --servo-- before "response".
Col. 10, line 43, delete "in" and insert --to--.
Col. 11, line 3, delete "dectector" and insert --detectors--.

Signed and Sealed this

Twelfth Day of April 1977

[SEAL]

Attest:

RUTH C. MASON
Attesting Officer

C. MARSHALL DANN
Commissioner of Patents and Trademarks